Nov. 14, 1950     A. SHEPELRICH     2,529,787
OIL DRIVEN TURBINE MOTOR VEHICLE WHEEL
Filed May 12, 1945     4 Sheets-Sheet 1

Inventor
Anton Shepelrich

By Clarence A. O'Brien
and Harvey B. Jacobson
Attorneys

Nov. 14, 1950

A. SHEPELRICH 2,529,787

OIL DRIVEN TURBINE MOTOR VEHICLE WHEEL

Filed May 12, 1945

Inventor
Anton Shepelrich
By Clarence A. O'Brien
and Harvey B. Jacobson
Attorneys Patented Nov. 14, 1950

2,529,787

UNITED STATES PATENT OFFICE 2,529,787

OIL DRIVEN TURBINE MOTOR VEHICLE WHEEL

Anton Shepelrich, Sayville, N. Y.

Application May 12, 1945, Serial No. 593,487

1 Claim. (Cl. 180—66)

This invention relates to motor vehicles and has for an object to provide means whereby oil forms the motive power thereof.

Another object of the invention is to provide in a vehicle an individual motor drive for each wheel thereof.

Another object of the invention is to provide in a vehicle a turbine engine encased in each wheel of the vehicle.

An important object of the invention is to provide a motor vehicle in which many of the expensive and complicated elements required in present day motor vehicles are eliminated, such, for instance, as differential gears, drive shaft, transmission gears, floating axles, etc., and requiring a far less powerful motor, thus not only greatly reducing the cost of manufacture, the cost of its upkeep, but also increasing the life of the machine.

A further object of this invention is to provide in a wheel a motor actuated by oil under pressure and so arranged that the speed of the wheel may be increased, decreased, reversed or stopped through the medium of the oil. The above and many other advantages of my invention will become manifest as the following specification will make them apparent.

Another object of the invention is to provide a combined oil drive and lubricating system.

Other features and advantages will become more readily apparent from the following description and the accompanying illustrative drawings in which:

Figure 6 is a section taken on line 6—6 of Figure 4.

My invention embraces a vehicle chassis 10, in each of the wheels 11, 12, 13 and 14, of which is mounted a turbine motor 15, whereby the vehicle will be provided with a direct drive for each wheel, not only providing better traction but also much better control. As all of the motors are identical in construction it will be necessary to describe only one in detail.

Figure 1:
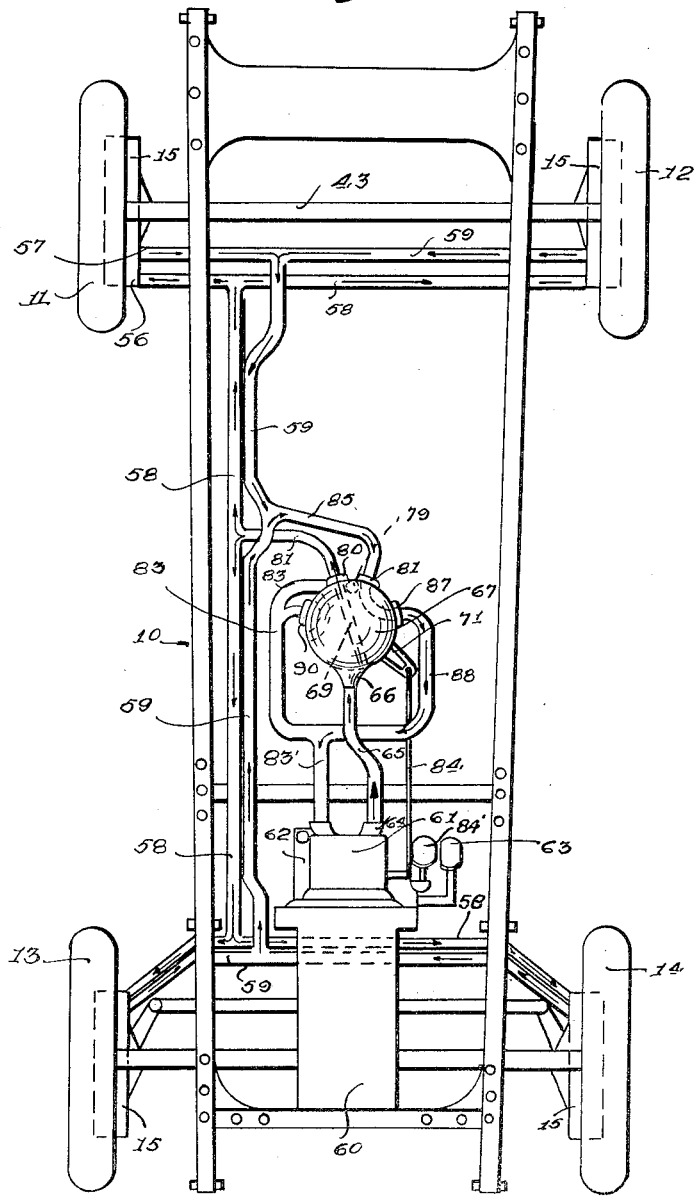
Figure 1 is a plan view of an automobile chassis embracing my invention.
Figure 2:
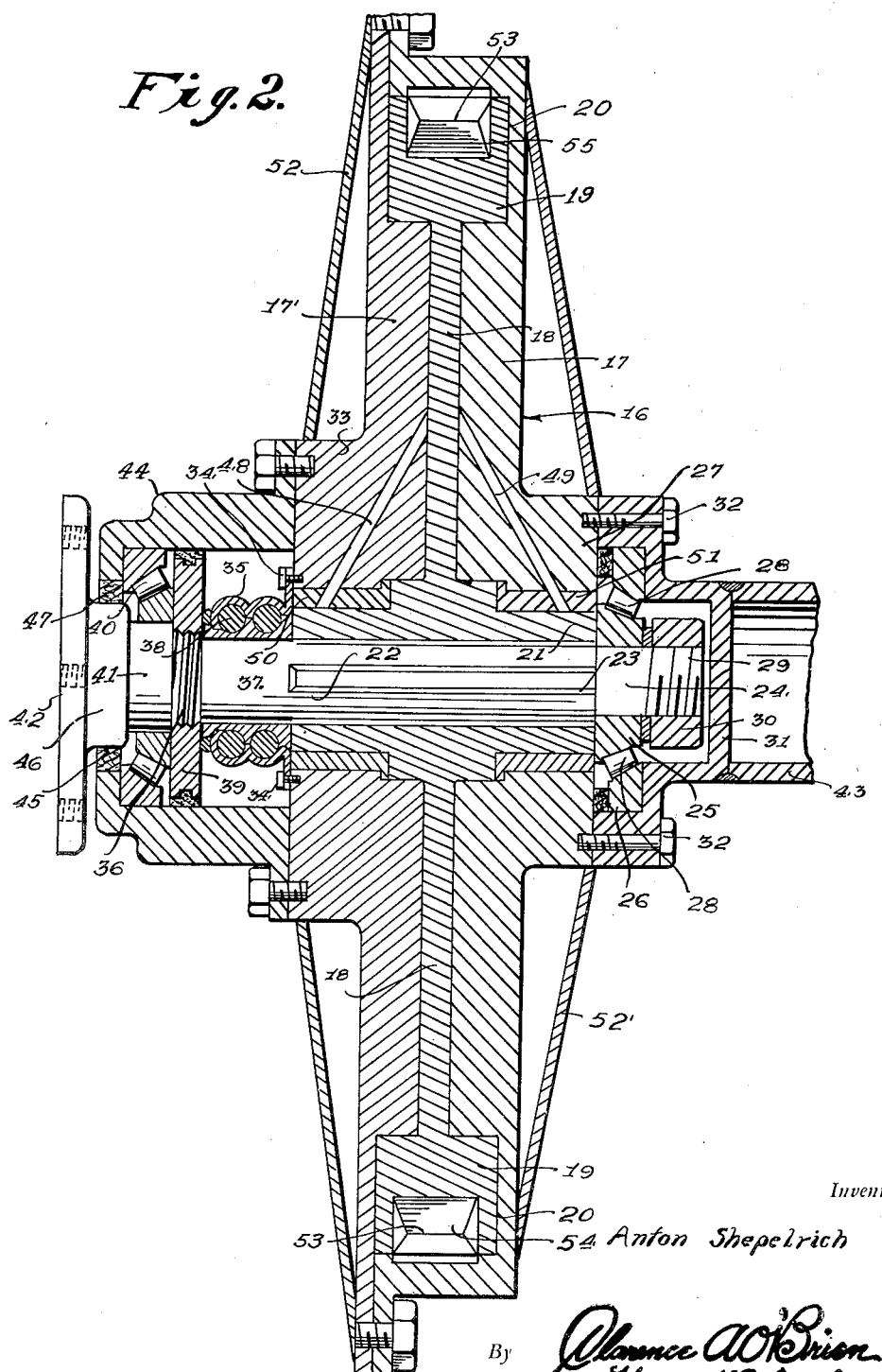
Figure 2 is a sectional view taken on line 2—2 of Figure 3.
Figure 3:
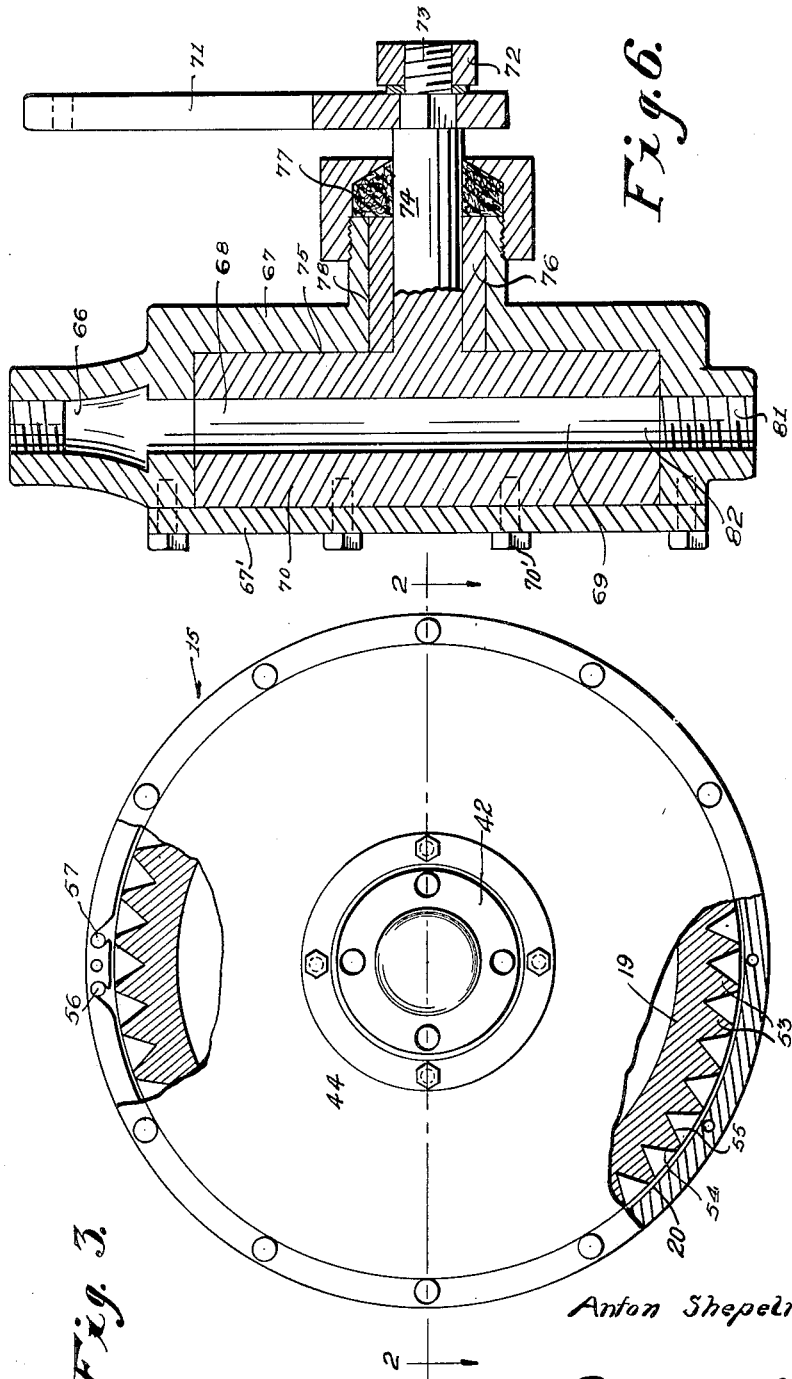
Figure 3 is an elevational view of a turbine, the wall being partly broken away.
Figure 4:
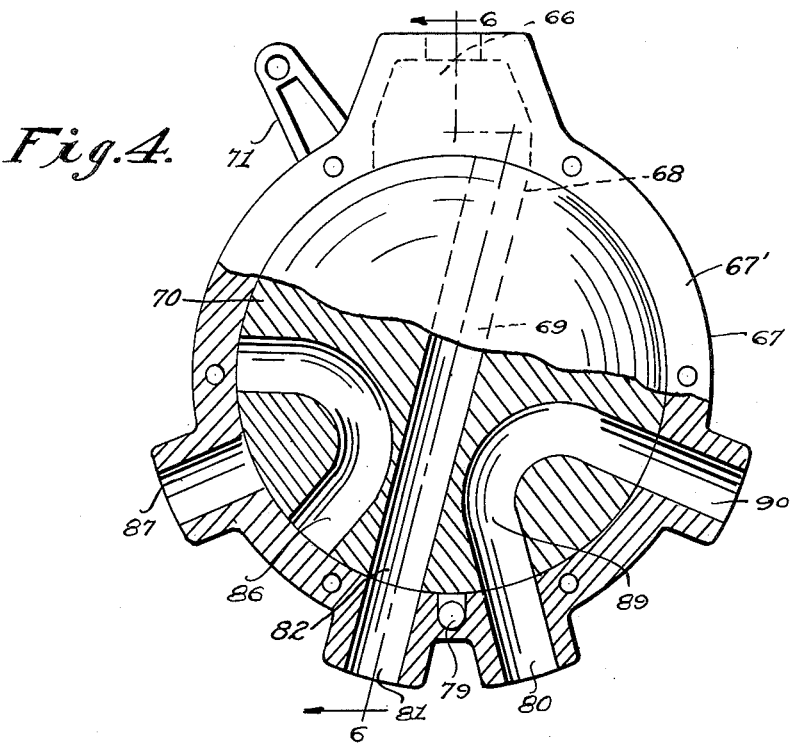
Figure 4 is a sectional plan view of an oscillatable valve member, the parts thereof being shown in solid and dotted lines.
Figure 5:
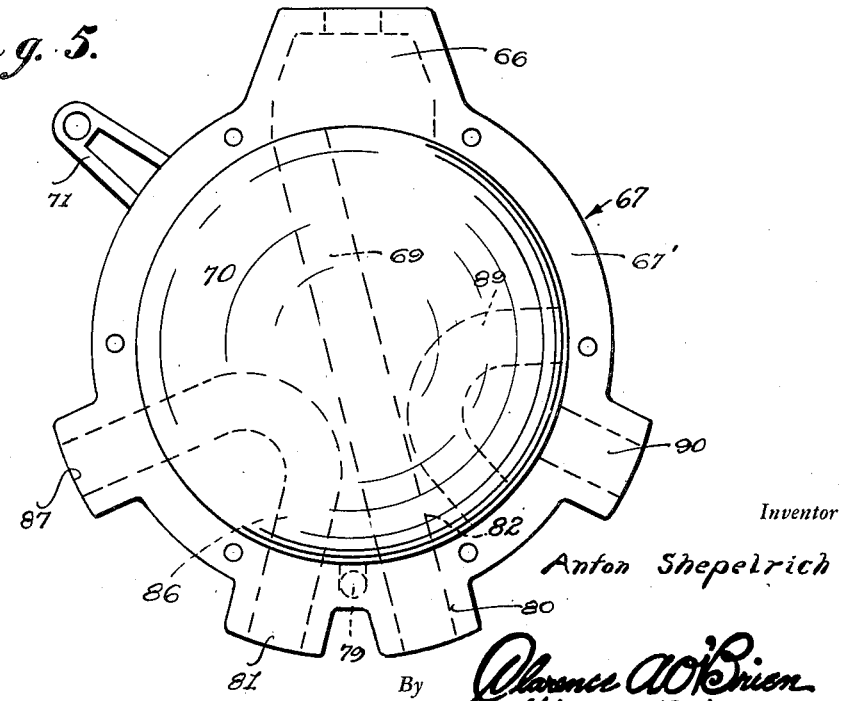
Figure 5 is a plan view of the oscillatable valve member, being shown in changed position.

Referring to Figure 2, of the drawings it will be noted that the turbine 15, consists of a stationary housing 16, formed of fixed walls 17 and 17', between which is provided a narrow annular chamber within which a rotor 18, operates, said rotor having an enlarged rim or annular head 19, operating in the annular chamber enlargement 20, in the peripheral portion of the said housing 16. The rotor 18, includes its hub 21, to which is fixed the stub or drive shaft 22, by a spline or key 23. Fixed on the end 24, of said shaft is a roller bearing including a bearing ring or collar 25, which, with a similar outer bearing ring or member 26, attached to the hub portions 27, of member 17, forms a runway for roller bearings 28. The terminal 29, of said shaft 22, is threaded to receive the nut 30. The tubular axle shaft 43 is welded on outside cap 31, which cap is secured to the part 27, by bolts 32 to hold housing 16 stationary. Secured to the hub part 33, of member 17', by bolts or screws 34, is an oil seal ring 35. Screw threaded on the end portion 36 of shaft 22, is an inner grease retainer 39 disposed against an annular shoulder of an enlarged end portion 41 of shaft 22, and outwardly of the retainer 39 on portion 41 is another roller bearing 40 similar to the one mounted on the end 24. The extreme end 41, of the drive or stub shaft 22, is formed with a flange plate 42, for attaching a wheel such as wheels 11, 12, 13 and 14 for driving the same. The elements 34 to 40, are enclosed within the outer bearing body or cap 44; between the bore 45, of which and the hub 46, of plate 42, is provided a grease retainer 47. The members 17 and 17', are provided in their inner portions with inclined or diagonal bores 48 and 49, for the passage of oil, said bores continuing through the bushings 50 and 51 seated between the bosses of said members and reduced ends of hub 21. A casing 52, is mounted over the housing 16. The rotor head 19, is provided at its periphery with saw-tooth vanes 53 spaced from the peripheral wall of the housing 16, adapted to be played upon on either side 54 or 55, thereof by oil passing into the annular passage 20, through one or the other ports 56 or 57. These ports are connected with pipe lines 58 and 59, which carry oil under pressure for driving the rotor 18, in one direction or another according to which direction it is desired to turn the wheels 11, 12, 13 and 14.

Connected with motor 60, is a pump 61, operated by said motor 60, which pump is supplied with renewal supply oil from tank 62. It may be explained here that the oil system now to be detailed is normally filled with oil and the system need only be supplied with oil from tank 62, at such times that a very slight depletion of oil in the system occurs. When the motor 60 is started, the pump 61 pumps oil through its outlet port 64, through pipe 65, to inlet port 66, of an oil directing valve housing 67 having a removable cover plate 67' held by cap screws 70'. The port 66, is of sufficient width to permit the inlet end 68, of a bore 69, passing straight through a cylindrical valve block 70, to keep in communication therewith, for the entire oscillating movement of the block by means of a lever 71, secured by a nut 72, to the reduced threaded end 73, of a stub shaft 74, integrally or otherwise secured to the center of the side 75, of the block 70. The shaft 74, operates through a bushing 76, and packing gland 77, connected with the bearing 78, of the housing 67.

There are three outlet ports 79, 80 and 81, from the housing 67, with which the bore 69, can communicate. When lever 71, is shifted so as to align end 82, of bore 69, with port 79, the position is neutral, the oil coming in through port 66, passing through bore 69, passing out of port 79, into pipes 83 and 83', back into pump 61, which cycle continues until it is desired to start the car at which time the driver shifts lever 71, through its connection 84 with a pedal 84' to rotate valve 70, so as to bring outlet 82, into alignment with port 80, whence the oil flows through pipe 81, to pipe 58, and thence to inlet port 56, of turbine 15, and operating the same to drive wheel 11, forward, the same action occurring in all of the turbines in wheels 12, 13 and 14. The oil passes from the turbine 15, through port 57, pipe line 59, branch line 85, into port 81, of valve housing 67 through U-shaped passage 86, in block 70, thence out of port 87, into pipes 88 and 83', back into pump 61. This cycle continues as long as the wheels are to move forward, the speed of the vehicle being controlled through the speed at which the pump is driven by motor 60, the speed of which is controlled by a mere pressure of the foot upon accelerator pedal 63.

In order to drive the car backward it is only necessary to shift lever 71, to bring valve block 70, in position to connect its outlet 82 with port 81, whereupon the oil will flow through pipe 85, to pipe 59, into port 57, and turn rotor 18 into reverse, the oil passing around to and out through port 56, pipe 58, branch 81, into port 80, of valve 67, thence through the U-shaped passage 89, out through port 90, into pipes 83 and 83', and into pump 61, which cycle continues, while the car is moved backward.

From the foregoing it will be seen that all of the working parts of my invention are lubricated with the motive power used to drive the turbines. It is obvious that any desired number of inlet and outlet ports may be provided for the turbine. It is also obvious that the invention may be used in connection with power boats, farm machinery, etc.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

A turbine motor for driving a vehicle wheel comprising a housing, a driven shaft having a flange plate on its outer end adapted to be secured to the vehicle wheel, a rotor in said housing having a hub keyed on said driven shaft, an inner bearing cap removably secured to the inner side of said housing over the inner end of said drive shaft, a stationary axle shaft fixed at one end to said cap, an anti-friction bearing between the inner end of the driven shaft and said cap, an outer bearing cap removably secured to the outer side of said housing over the outer end of said driven shaft, a second anti-friction bearing between the outer end of the driven shaft and the outer bearing cap, an oil seal ring and an inner grease retainer on the outer end of said driven shaft between the hub of the rotor and the second anti-friction bearing, and an outer grease retainer between the outer bearing cap and the flange plate at the outer side of the second-named anti-friction bearing.

ANTON SHEPELRICH.

REFERENCES CITED

The following references are of record in the file of this patent:

UNITED STATES PATENTS

| Number | Name | Date |
| --- | --- | --- |
| 639,541 | Dyer et al. | Dec. 19, 1899 |
| 716,791 | Upson | Dec. 23, 1902 |
| 732,908 | Thomson | July 7, 1903 |
| 800,684 | Schneider | Oct. 3, 1905 |
| 1,099,161 | Brown | June 9, 1914 |
| 1,242,033 | Painter et al. | Oct. 2, 1917 |
| 1,364,246 | Carrey | Jan. 4, 1921 |
| 1,784,433 | Gregg | Dec. 9, 1930 |
| 2,355,604 | Rupp | Aug. 15, 1944 |
| 2,394,160 | Emmitt | Feb. 5, 1946 |

OTHER REFERENCES

"The American Inventor," vol. 15, No. 4, page 101, published at 114 Liberty Street, New York, New York. (Copy in Div. 18.)